(No Model.)

H. J. VOGEL.
DUST PAN.

No. 359,111. Patented Mar. 8, 1887.

Witnesses
J. W. Loud
J. G. Cross

Inventor
Henry J. Vogel,
By his Attorney A. G. Huylman

UNITED STATES PATENT OFFICE.

HENRY J. VOGEL, OF BROOKLYN, NEW YORK.

DUST-PAN.

SPECIFICATION forming part of Letters Patent No. 359,111, dated March 8, 1887.

Application filed November 18, 1886. Serial No. 219,275. (No model.)

*To all whom it may concern:*

Be it known that I, HENRY J. VOGEL, a citizen of the United States of America, residing at Brooklyn, in the county of Kings and State of New York, have invented a new and useful Dust-Pan, of which the following is a specification.

My invention has relation to improvements in dust-pans; and the object is to make a dust-pan which can be packed for shipment in quantities or numbers in less space than those now furnished to the trade, thus saving freight, boxing, and labor. I attain this object by making the handle of the pan separable from the pan itself.

My improvements are fully illustrated in the accompanying drawings, wherein—

Figure 1:
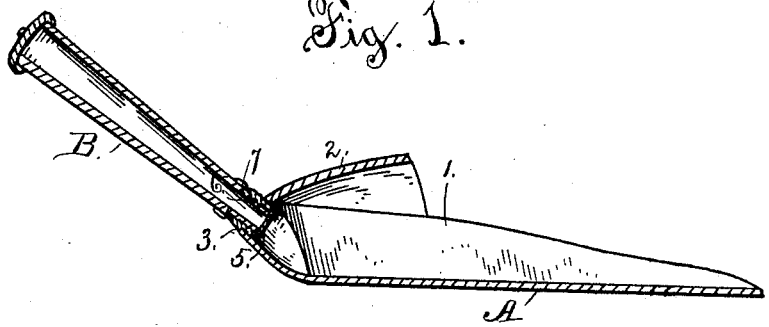
Figure 2:
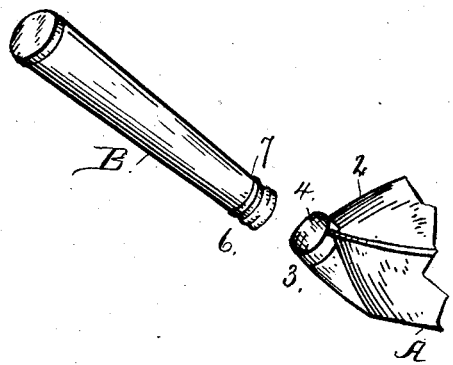

Figure 1 is a longitudinal sectional view taken centrally through the detachable handle, the threaded socket, and the pan. Fig. 2 is a detail view of the handle and the socket, the latter being broken away from the pan.

In the different demonstrations the same notations refer to the same parts, and reference being had thereto, the letter A designates the bottom of the pan, which is of any of the approved constructions, being struck up on three sides with a broad flange, as 1, and over the back part is secured the keeper and brace-plate 2. In the middle of the flange, across the end, is secured the handle-socket 3, the upper end of which is formed with screw-threads 4, and at the point in the socket where these screw-threads terminate there is secured by soldering a bottom plate, 5, which sets across the socket and serves as a brace to the metal of the socket and as a seat to stop the handle from being screwed in too far, and thus spread the threads or do other damage to the connection. The socket-piece should not extend outward much above the end flange, because by confining the walls of the socket to the walls of the flange and keeper they are held with greater security and rigidity, and thus make a firmer seat for the end of the handle.

The letter B designates the handle, which is a cylinder of sheet metal, and has formed on or secured to its lower end a threaded section, 6, which fits the threads of the socket in the pan. While the metal of the handle may be formed with the threads on its end, I find it makes a better and stronger construction to make the threaded portion 6 of a screw-threaded ring of such metal as is used for making the nozzles and caps of tin cans. This threaded ring is soldered to the handle, as at 7, and the lower end is flanged or crimped inward to strengthen it, so as to keep it in shape. In packing, the handle is placed in the pan under the keeper and the pans then laid on top of each other. When unpacked and exposed for sale, the pan and handle are united by simply screwing the handle in the socket until the shoulder formed by the union of the threaded ring comes down on the edge of the socket or the end of the handle reaches the bottom piece of the socket.

I am aware that a grocer's scoop has been made with a wooden head-piece, in which is screwed and glued a handle, and I make no claim to such an article; but

What I claim is—

As an improved article of manufacture, the dust-pan herein described, consisting of the pan A, formed with a sheet-metal screw-threaded handle-socket, 3, set in the end flange of keeper of the pan, and a brace and bottom plate, 5, set in the handle-socket, and a detachable sheet-metal handle, B, formed with screw-threads 6 in its lower end to set within the handle-socket of the pan, substantially as specified.

In witness whereof I have hereunto set my hand in the presence of two attesting witnesses.

HENRY J. VOGEL.

Attest:
FRED J. GANS,
BENJ. F. SANBORN.